US012789537B2

(12) United States Patent
Maynard et al.

(10) Patent No.: US 12,789,537 B2
(45) Date of Patent: Nov. 10, 2026

(54) LID SUBSYSTEM FOR MEDIA PROCESSING DEVICES

(71) Applicant: Zebra Technologies Corporation, Lincolnshire, IL (US)

(72) Inventors: Raymond E. Maynard, Westerly, RI (US); Morgan Hassan Malone, Swansea, MA (US); Michael F. St. Germain, West Warwick, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 177 days.

(21) Appl. No.: 18/929,511

(22) Filed: Oct. 28, 2024

(65) Prior Publication Data

US 2025/0050660 A1 Feb. 13, 2025

Related U.S. Application Data

(60) Continuation of application No. 18/239,713, filed on Aug. 29, 2023, now Pat. No. 12,128,673, which is a (Continued)

(51) Int. Cl.

| | |
|---|---|
| ***B41J 11/04*** | (2006.01) |
| ***B41J 2/175*** | (2006.01) |
| ***B41J 2/32*** | (2006.01) |
| ***B41J 3/36*** | (2006.01) |
| ***B41J 3/407*** | (2006.01) |
| ***B41J 11/00*** | (2006.01) |
| ***B41J 15/02*** | (2006.01) |

(Continued)

(52) U.S. Cl.

CPC ......... *B41J 3/4075* (2013.01); *B41J 2/17506* (2013.01); *B41J 2/32* (2013.01); *B41J 3/36* (2013.01); *B41J 11/0045* (2013.01); *B41J 11/04* (2013.01); *B41J 15/02* (2013.01); *B41J 15/044* (2013.01); *B41J 29/02* (2013.01); *B41J 29/023* (2013.01); *B41J 29/13* (2013.01)

(58) Field of Classification Search

CPC ... B41J 11/02; B41J 11/04; B41J 2/315; B41J 2/32; B41J 3/36; B41J 3/407; B41J 3/4075; B41J 15/02; B41J 15/04; B41J 15/042; B41J 29/02; B41J 29/023; B41J 29/12; B41J 29/13

See application file for complete search history.

(56) References Cited

U.S. PATENT DOCUMENTS

2002/0048479 A1* 4/2002 Bryant ..................... B41J 11/42 400/247

2010/0143018 A1* 6/2010 Kawaguchi .............. B41J 11/70 400/621

* cited by examiner

*Primary Examiner* — Douglas X Rodriguez
*Assistant Examiner* — Kendrick X Liu

(57) ABSTRACT

A printer includes: a body with a set of interior walls defining a media enclosure configured to receive a media cartridge, and a latch recess in one of the interior walls, including a retaining surface, and a ramp surface; a lid rotatably coupled to the body and movable between open and closed positions; and a latch movably supported by the lid between a locked position and an unlocked position, the latch including: a bias member biasing the latch towards the locked position, a hook surface configured to engage the retaining surface when the lid is closed and the latch is in the locked position, and a cam surface configured via the bias member, when the lid is closed and the latch is released to the unlocked position, to slide against the ramp surface and lift the lid to an intermediate position between the open and closed positions.

10 Claims, 8 Drawing Sheets

Related U.S. Application Data division of application No. 17/071,615, filed on Oct. 15, 2020, now Pat. No. 11,772,395.

(51) Int. Cl.

| | |
|---|---|
| ***B41J 15/04*** | (2006.01) |
| ***B41J 29/02*** | (2006.01) |
| ***B41J 29/13*** | (2006.01) |

LID SUBSYSTEM FOR MEDIA PROCESSING DEVICES

RELATED APPLICATIONS

The present application is continuation of U.S. patent application Ser. No. 18/239,713, filed on Aug. 29, 2023, which is a divisional of U.S. patent application Ser. No. 17/071,615 (now U.S. Pat. No. 11,772,395), filed on Oct. 15, 2020, which is incorporated by reference herein in its entirety.

BACKGROUND

A media processing device, such as a label printer, may store a supply of media for processing, e.g. by printing or otherwise applying indicia to the media. When the supply of media stored by the media processing device is exhausted, the supply may be replenished by accessing an interior of the device to install a new supply, such as a new roll of labels. Accessing the interior of the device may, however, be a complex and error prone task, which may lead to damage to the device and/or incorrect installation of new media.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7A is a diagram of a frame of the lid of the printer of FIG. 1.

Figure 1:
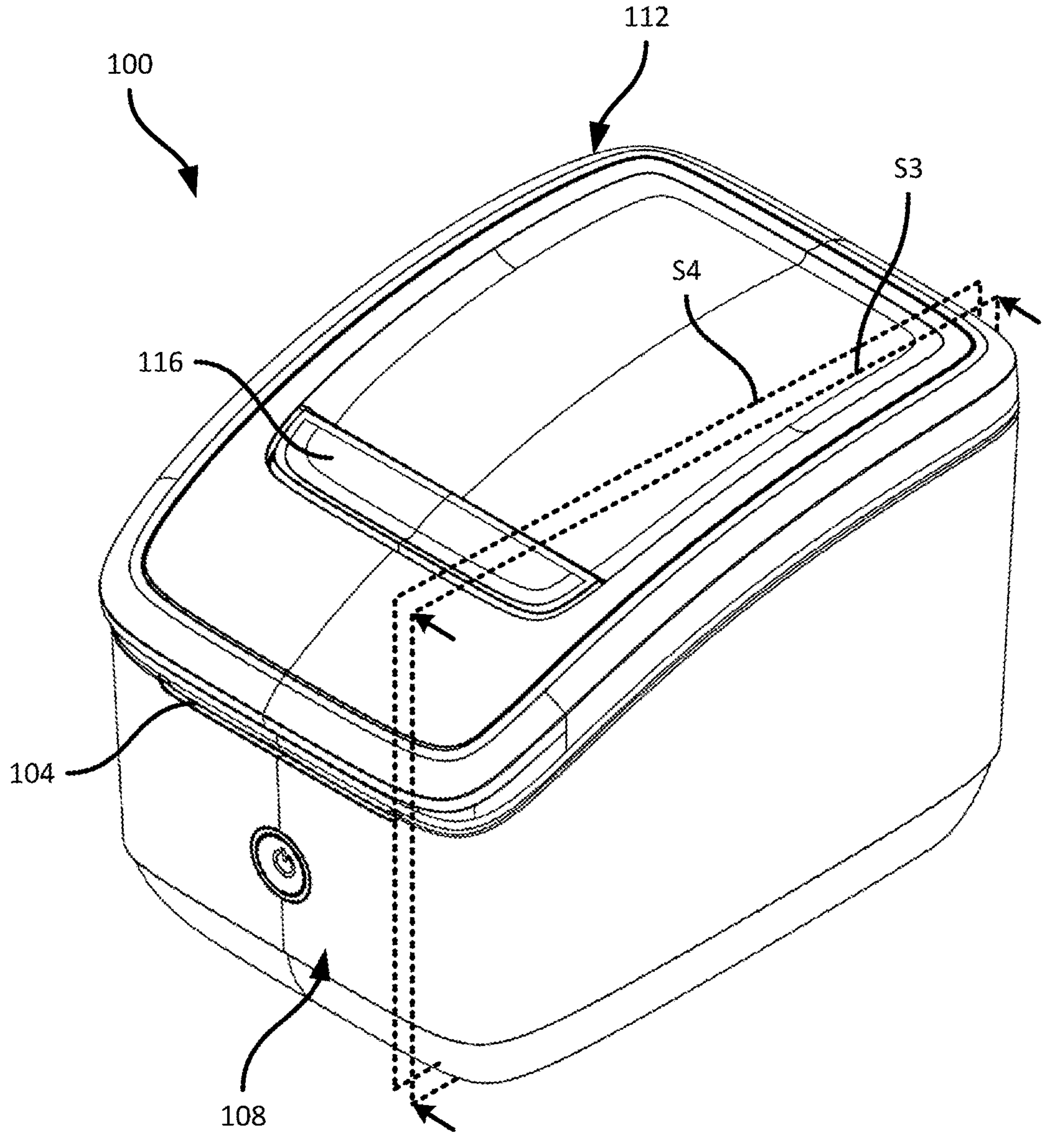
FIG. 1 is an isometric view of a printer with a lid thereof in a closed position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Media supplies, such as rolls of labels used in printers or other media processing devices, require periodic replacement, e.g. when the media supported by the roll or other structure is exhausted. Replacing a media supply typically requires access to the interior of the printer by an operator. Consumer-oriented printers may be maintained by a wide variety of operators lacking experience operating and maintaining such devices. Access to the interior of the printer may be a complex, multi-step process that, if performed incorrectly by such operators, may result in damage to the printer, incorrect loading of media, or the like.

Examples disclosed herein are directed to a printer, comprising: a body including: (i) a set of interior walls defining a media enclosure configured to receive a media cartridge, and (ii) a latch recess in one of the interior walls, the latch recess including a retaining surface, and a ramp surface; a lid rotatably coupled to the body and movable between a closed position enclosing the media enclosure, and an open position; and a latch supported by the lid, movable relative to the lid between a locked position and an unlocked position, the latch including: (i) a bias member biasing the latch towards the locked position, (ii) a hook surface configured to engage the retaining surface when the lid is closed and the latch is in the locked position, and (iii) a cam surface configured via the bias member, when the lid is closed and the latch is released to the unlocked position, to slide against the ramp surface and lift the lid to an intermediate position between the open and closed positions.

Additional examples disclosed herein are directed to a printer, comprising: a body including a set of interior walls defining (i) a media enclosure configured to receive a media cartridge, and (ii) a media outlet; a lid rotatably coupled to the body and movable between a closed position enclosing the media enclosure, and an open position, the lid including: (i) a frame having a first media guide surface with a first set of castellations, (ii) a carriage supporting a platen roller, the carriage movably supported by the frame and including a second media guide surface with a second set of castellations configured to interlace with the first set of castellations to define a continuous media guide for media exiting the enclosure.

FIG. 1 illustrates a media processing device 100, also referred to herein as a printer 100. The printer 100 can be, for example, a desktop label printer configured to accept media such as a roll of labels, and to apply indicia to the labels, which may then exit the printer 100 via an outlet 104. The outlet is defined at least in part by a body 108 of the printer 100. The body 108 includes a set of walls (e.g. a set of outer walls, visible in FIG. 1, and a set of inner walls, discussed later herein) that house various components of the printer 100 and define an interior enclosure for accepting the above-mentioned media. The media may be received in the enclosure in the form of a cartridge containing a roll of labels, for example.

The printer 100 also includes a lid 112 movably coupled to the body 108. The lid 112 is movable between the closed position shown in FIG. 1, in which the above-mentioned enclosure for the media is enclosed, and an open position permitting access to the enclosure. The lid 112 includes a latching mechanism, discussed below in greater detail, that serves to retain the lid 112 in the closed position during operation of the printer 100. The latching mechanism is released by depressing a button 116 or other lever mechanism provided on the lid 112. In addition, the lid 112 contains certain structural features that, in response to depression of the button 116, transition the lid 112 from the closed position to an intermediate position (i.e. a partially open position). The intermediate position provides a clear visual indication to an operator that the latching mechanism has been released and the lid 112 may be swung open. Additionally, the lid 112 includes certain structural features to facilitate the movement of the lid 112 by an operator from the closed position or the intermediate position to the open position.

Figure 2:
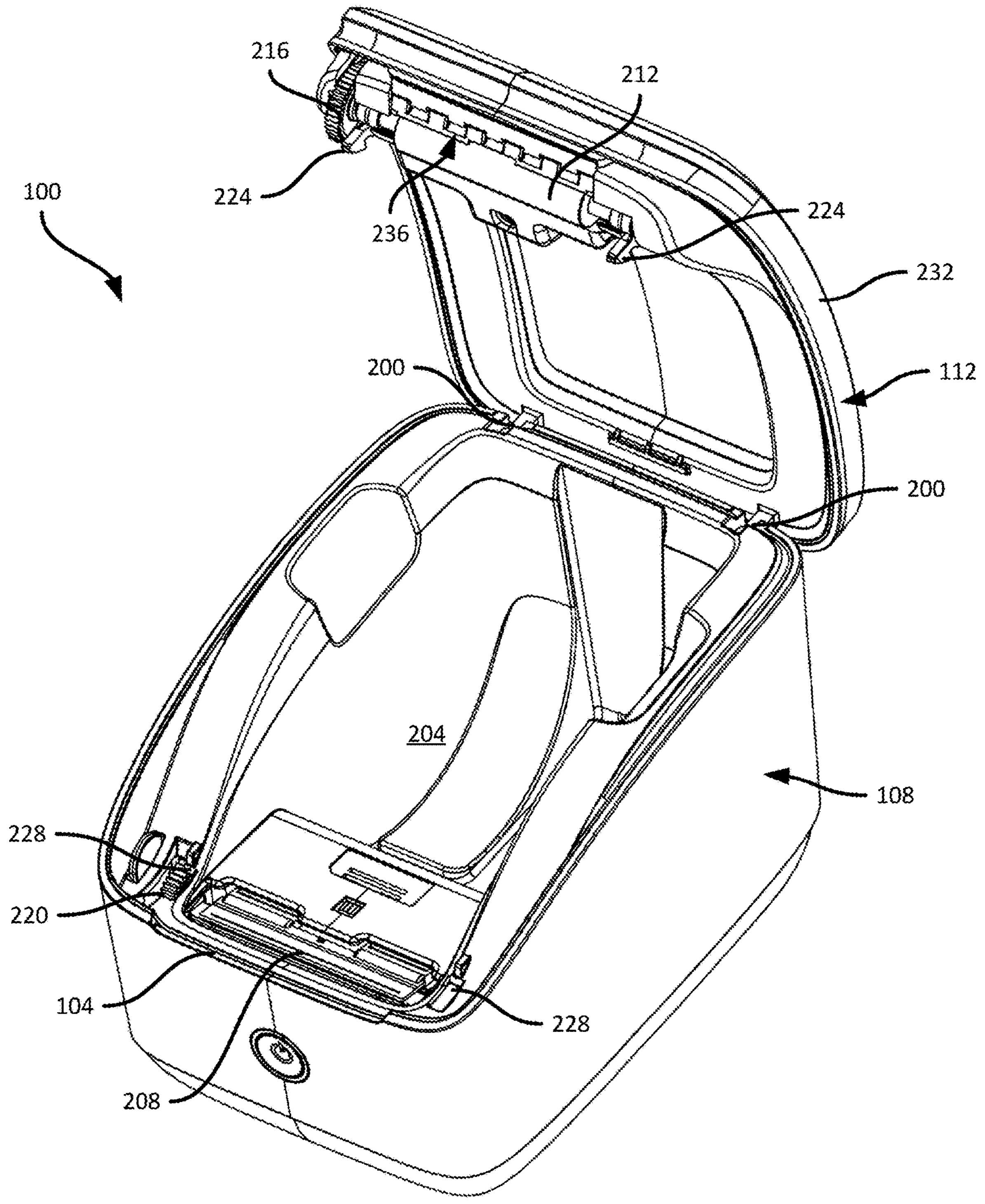
FIG. 2 is an isometric view of the printer of FIG. 1, with the lid in an open position.

Turning to FIG. 2, the printer 100 is shown with the lid 112 in the open position. In particular, the lid 112 is rotatable relative to the body 108 at a hinge 200. The above-mentioned enclosure 204 defined within the body 108 is also shown in FIG. 2, and is configured to receive a cartridge containing a roll of media, such as labels. Labels are dispensed from the cartridge and traverse a printhead 208 before exiting the printer 100 at the outlet 104. The printhead 208 forms a nip, along with a platen roller 212. The platen roller 212, which as shown in FIG. 2 is supported within the lid 112, is driven via a drive mechanism in the body 108 of the printer 100.

In the illustrated example, the platen roller 212 is coupled to a gear 216, which is configured to engage with a drive gear 220 mounted in the body 108 and driven by a motor (not shown). As will be apparent, the gears 216 and 220 are not engaged when the lid 112 is in the open position. Instead, the gears 216 and 220 are engaged when the lid 112 is in the closed position.

The latching mechanism mentioned above includes a latch 224 (two latches 224 are included in the present example) that is movable relative to the lid 112, e.g. responsive to depression of the button 116. The latch(es) 224 engage a corresponding latch recess 228 (two recesses 228, in the illustrated example) defined in the body 108. Further features of the latch 224 and latch recess 228 will be described in greater detail below. As will also be further described below, the platen roller 212 and the gear 216 are movable with the latch 224 relative to the remainder of the lid 112. Specifically, the lid 112 includes a frame 232, and the latch 224 and platen roller 212 are movably supported by the frame 232, between a locked position in which the latch 224 engages the latch recess 228 to retain the lid 112 in the closed position, and an unlocked position in which the latch 224 disengages from the latch recess 228 to allow opening of the lid 112.

The latch 224 and platen roller 212, in this example, are movably supported in the frame 232 by a carriage 236 that is rotatably mounted within the frame 232 of the lid 112. As will be seen below, rotation of the carriage 236 serves several functions, including locking and unlocking the latch 224, engaging and disengaging the gears 216 and 220, and transitioning the lid 112 to the intermediate position mentioned earlier.

Figure 3:
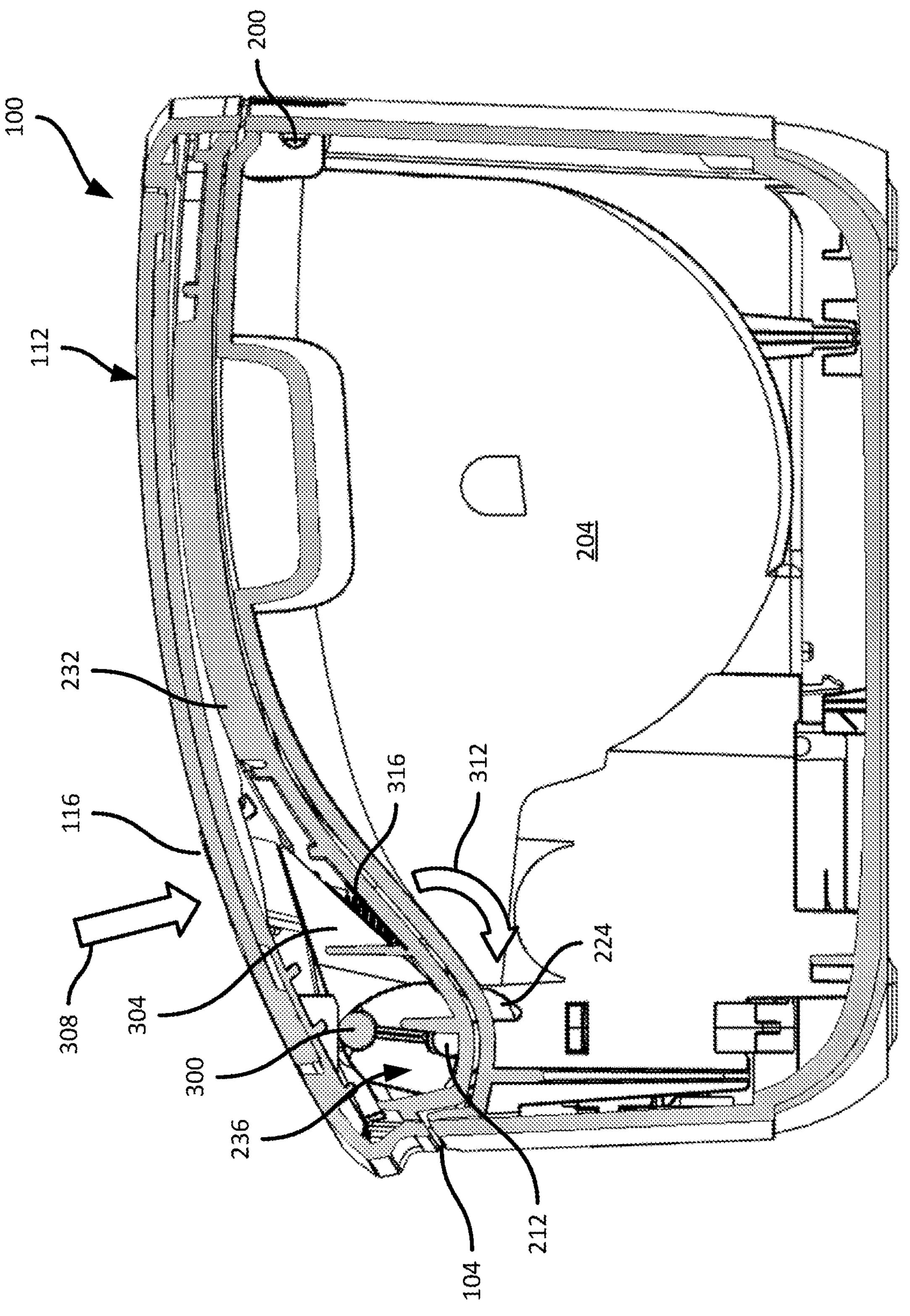
FIG. 3 is a cross section of the printer of FIG. 1 at the plane S3.

Turning to FIG. 3, a cross sectional view of the printer 100 taken at the plane S3 shown in FIG. 1. is illustrated. In particular, the carriage 236 is visible within the frame 232. The carriage 236 is coupled to the frame 232 by a spindle 300 that protrudes into complementary recesses in the frame 232. The carriage 236 therefore rotates relative to the frame 232 about the spindle 300. The carriage further includes an arm 304 connecting a main body of the carriage 236 to the button 116. In some examples, the button 116 can be integrally formed with the arm 304 and the remainder of the carriage 236. Thus, depression of the button 116 in the direction 308 causes rotation of the carriage 236 about the spindle 300 in a direction 312. As will be discussed below, rotation of the carriage 236 also rotates the latch 224, which extends from the carriage 236.

Rotation in the direction 312 moves the latch 224 to an unlocked position (the locked position is illustrated in FIG. 3). The carriage 236, and therefore the latch 224 and the button 116, are biased towards the locked position, for example by a bias member such as a coil spring 316 between the frame 232 and the arm 304.

Figure 4:
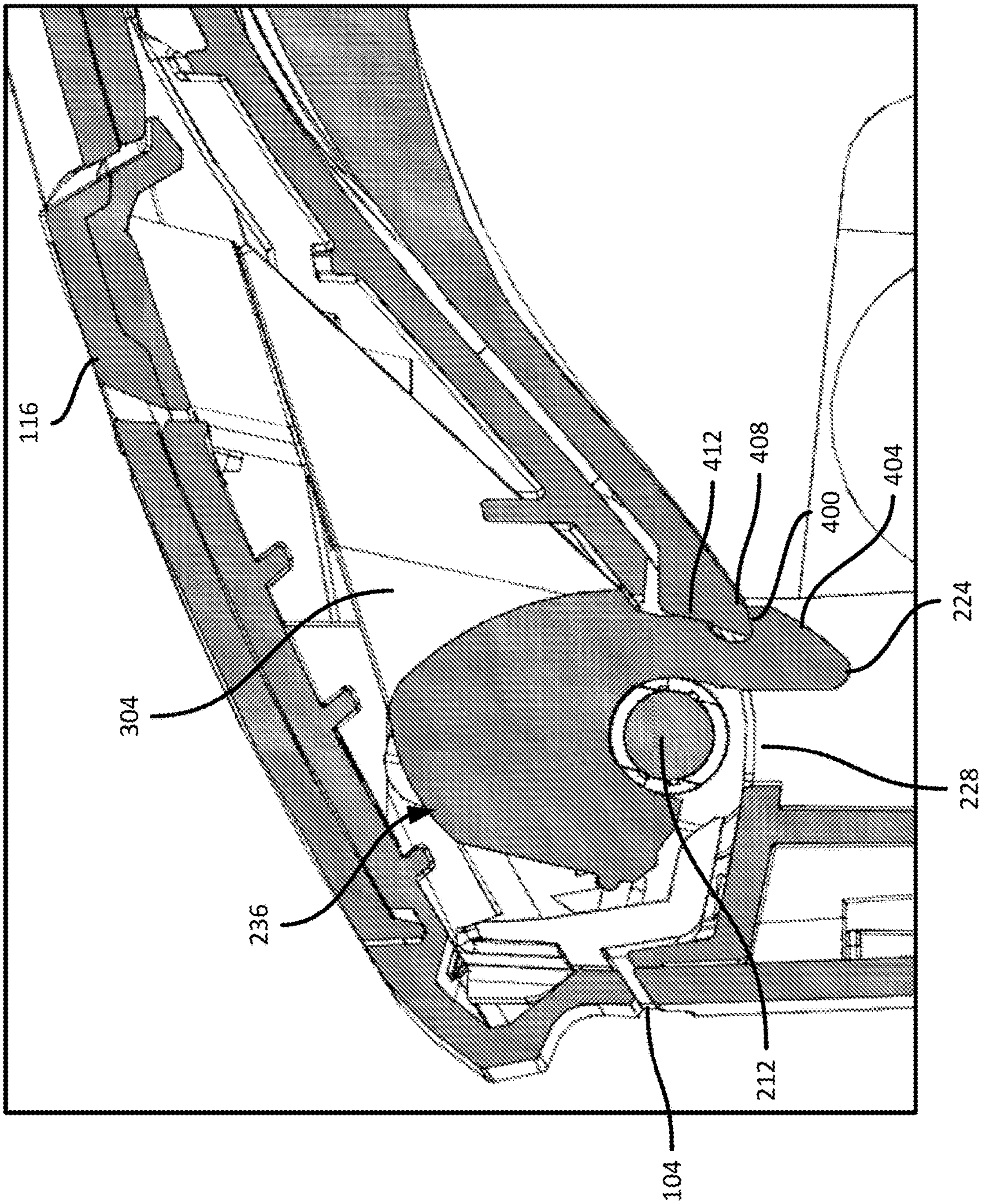
FIG. 4 is a detail view of a cross section of the printer of FIG. 1 at the plane S4, with a latching mechanism in a locked position.

Referring to FIG. 4, a detail view of a cross section taken in the plane S4 as shown in FIG. 1 is illustrated. The section view of FIG. 4 reveals the structure of the latch 224, which extends downwards from the carriage 236, and of the latch recess 228 of the body 108 of the printer 100. In particular, the latch recess 228 and the latch 224 include various surfaces configured to interact with one another under certain conditions.

The latch 224, in particular, includes a hook surface 400, and a cam surface 404. The recess 228, in turn, includes a retaining surface 408 and a ramp surface 412. When the latch 224 is in the locked position and the lid 112 is in the closed position, as shown in FIG. 4, the hook surface engages with the retaining surface to retain the latch 224 (and therefore the lid 112 as a whole) in the closed position. As a result, the gear 216 of the platen roller 212 is also engaged with the drive gear 220 mentioned earlier. Further, the platen roller 212 is placed adjacent to the printhead 208 (not shown in FIG. 4 for clarity) to form a nip through which the media is drawn. In other words, with the lid 112 in the closed position and the latch 224 in the locked position, the printer 100 is in an operational state, in which media can be drawn from the enclosure 204 and processed at the printhead 208 before exiting via the outlet 104.

When the button 116 is depressed, the carriage 236 rotates in a clockwise direction (in the orientation shown in FIG. 4). Rotation of the carriage, as will now be apparent, releases the hook surface 400 from the retaining surface 408, thus enabling the lid 112 to move towards the open position.

Figure 5:
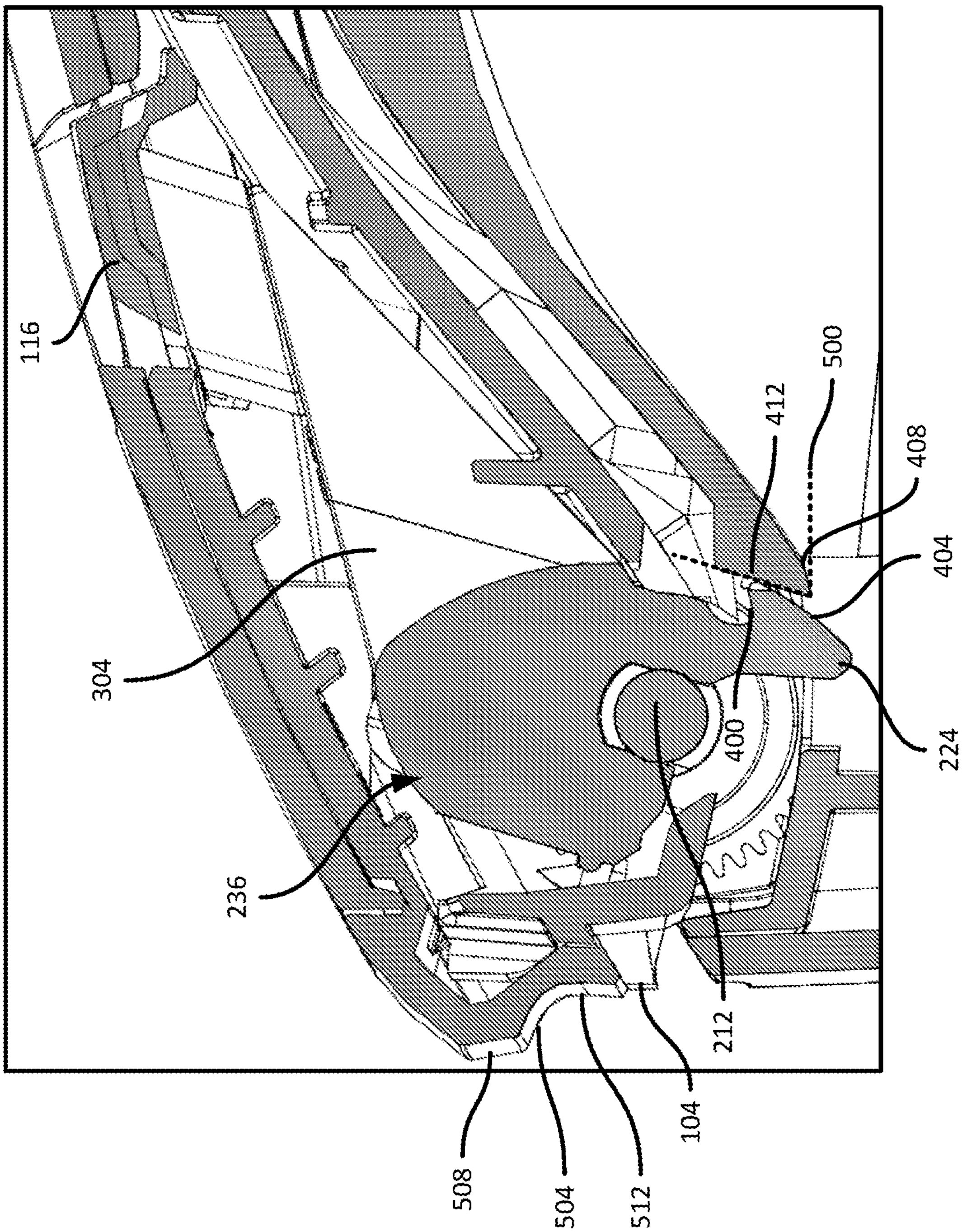
FIG. 5 is a detail view of a cross section of the printer of FIG. 1 at the plane S3, with the latching mechanism in an unlocked position.

Turning to FIG. 5, the cross section of FIG. 4 is shown following a release of the latch 224 from the locked position to an unlocked position. The button 116 is shown as having been depressed from the initial position shown in FIG. 4, and the carriage 236 has therefore rotated clockwise relative to the orientation shown in FIG. 4. The hook surface 400 disengages from the retaining surface 408. Further, the cam surface 404 comes into engagement with the ramp surface 412. The action of the bias member 316 serves to rotate the carriage 236 in the counter-clockwise direction, back towards the locked position. However, because the cam surface 404 has engaged the ramp surface, rather than re-locking (in the absence of sufficient downward pressure on the lid 112), the cam surface 404 instead exerts pressure on the ramp surface 412. That pressure causes the cam surface 404 to slide along the ramp surface 412.

The ramp surface 412, as seen in FIG. 5, is angled to permit such sliding motion, which causes the lid 112 to move from the closed position to an intermediate position. As seen in FIG. 5, particularly at the outlet 104, the lid 112 has lifted from the closed position towards the open position. The transitional position shown provides a visual indication that the lid 112 is unlatched and ready to be opened (further opening, after the cam surface 404 reaches the upper end of the ramp surface 412, require additional mechanical input, e.g. from the operator).

The ramp surface 412, to enable the partial opening of the lid 112 by the bias member 316, is inclined in the direction of rotation of the carriage 236. That is, the carriage 236 is biased to rotate in a counterclockwise direction as illustrated (by the bias member 316). The latch 224, in such a rotation, travels generally from below and to the left towards above and to the right. The ramp surface 412 follows a similar trajectory. As will be apparent, a range of angles may be suitable for the ramp surface 412. For example, the cam surface 412 may be provided with an angle 500 (relative to horizontal) that is below 90 degrees. In some examples, the angle 500 of the ramp surface 412 can be between 60 and 80 degrees.

In the illustrated example, the ramp surface has an angle of about 75 degrees, with an upper end of the ramp surface 412 (closer to the button 116) being further to the rear of the printer 100 (i.e. closer to the hinges 200) and a lower end of the ramp surface being further to the front of the printer 100 (i.e. closer to the outlet 104). More generally, the angle of the ramp surface 412 can be selected such that the force exerted by the cam surface 404 (as a result of the bias member 316) is sufficient to overcome friction between the cam surface 404 and the ramp surface 412.

An example advantage of the arrangement illustrated in FIGS. 4 and 5, in addition to the provision of a visual indication when the lid 112 is unlatched and ready for opening, is that such an indication can be provided without additional biasing members. That is, the bias member 316 both biases the button 116 upwards and the latch to the locked position, and serves to apply force, via the cam surface 404, to partially open the lid 112 when the latch 224 is released.

Figure 6:
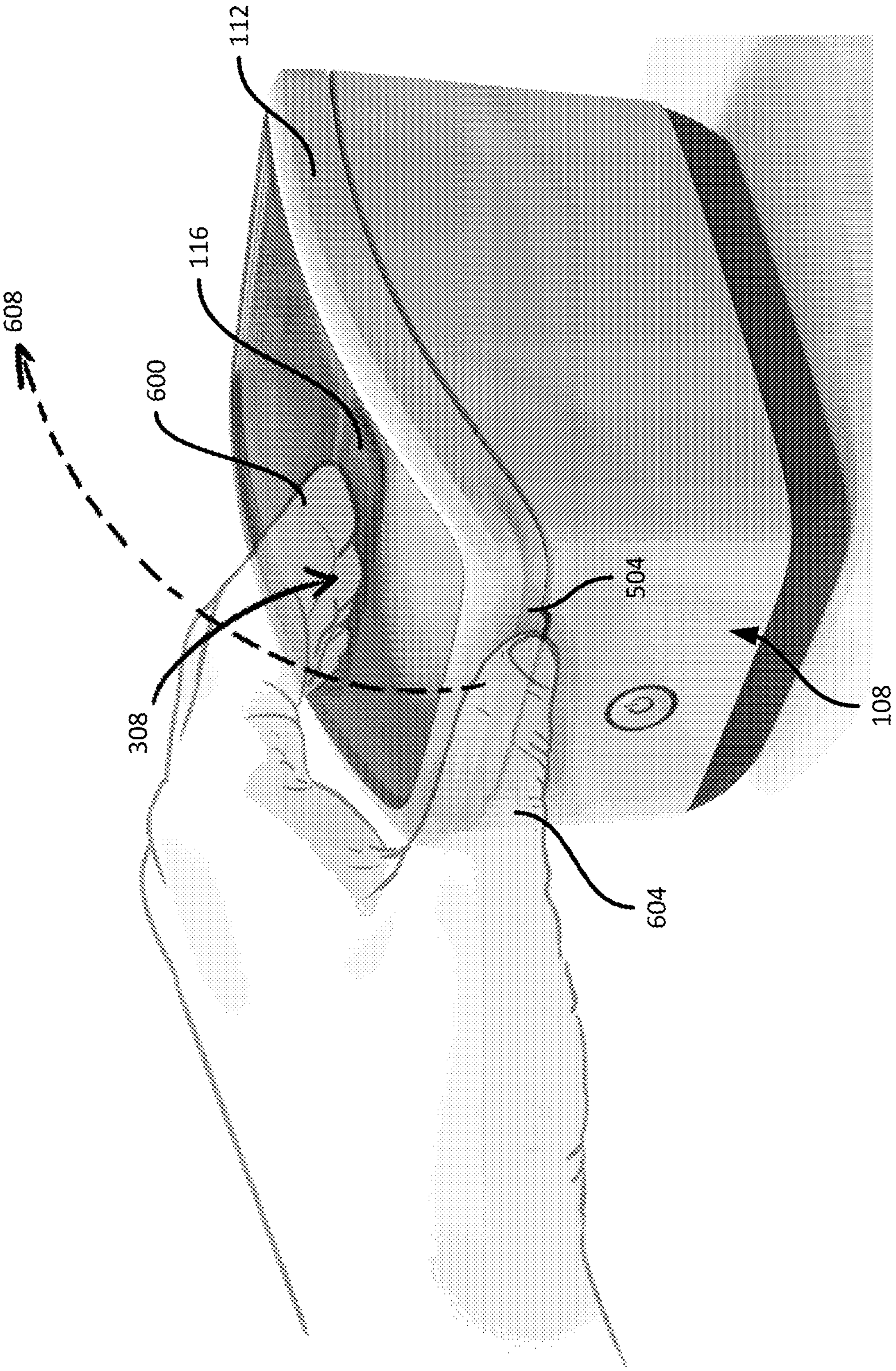
FIG. 6 is a diagram illustrating opening of the printer of FIG. 1.

The lid 112 also includes an undercut 504. The undercut 504 is a region of the lid 112 in which a first forward surface 508 of the lid 112 extends beyond a second forward surface 512, and enables an operator to lift the lid 112 by exerting upwards pressure on the undercut 504. In particular, turning to FIG. 6, the lid 112 may be opened by an operator with one hand, and without repositioning the hand during opening. In particular, the operator may first depress the button 116 in the direction 308 with their fingertips 600. Depressing the button 116, as shown above, releases the latch 224 from the locked position and enables the bias member 316 to partially open the lid 112 when the operator releases the pressure applied via the fingertips 600.

As will be apparent, depression of the button 116 also disengages the gears 216 and 220, thus decoupling the platen roller 212 from the drive mechanism in the body 108 in preparation for opening of the lid 112. The operator may then insert the thumb 604 under the undercut 504, and lift the lid 112 in the direction 608. Further, depression of the button 116 provides an edge for the fingertips 600 to grip while lifting the lid 112.

As will be apparent from FIGS. 2 and 4, although the body 108 defines a portion of the outlet 104, the outlet 104 is also defined in part by the lid 112. That is, a lower portion of the outlet 104 is defined by the body 108, and an upper portion of the outlet 104 is defined by the lid 112. As such, both the body 108 and the lid 112 include media guide surfaces to guide the media from the nip formed by the printhead 208 and the platen roller 212 to the outlet 104. A gap in such a guide surface may cause a leading edge of the media to catch in the gap, jamming or otherwise interrupting operation of the printer 100.

In the present example, the frame 232 and the carriage 236 both include guide surfaces between the platen roller 212 and the outlet 104. Because the platen roller 212 (as well as the carriage 236) move relative to the frame 232 of the lid 112, those guide surfaces are configured to interact to provide a relatively gap-free guide structure for the media, while permitting movement of the carriage 236 relative to the frame 232.

Figure 7B:
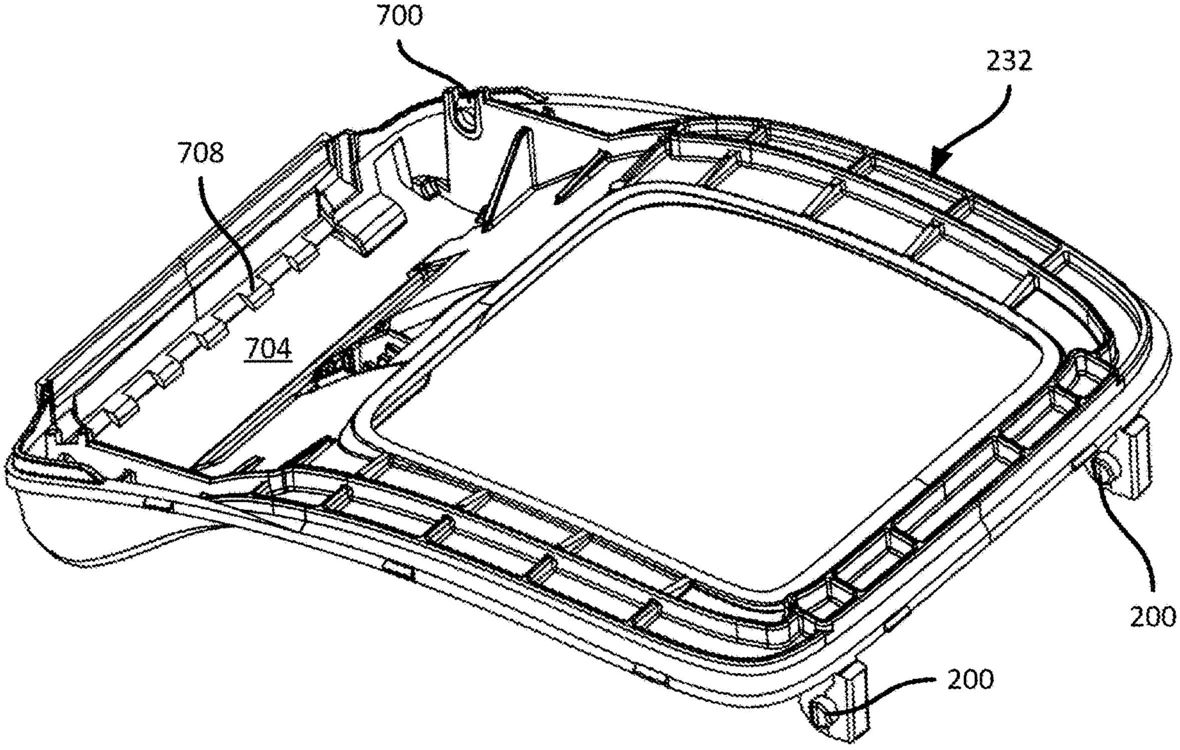
FIG. 7B is a diagram of a carriage of the lid of the printer of FIG. 1.
Figure 7B:
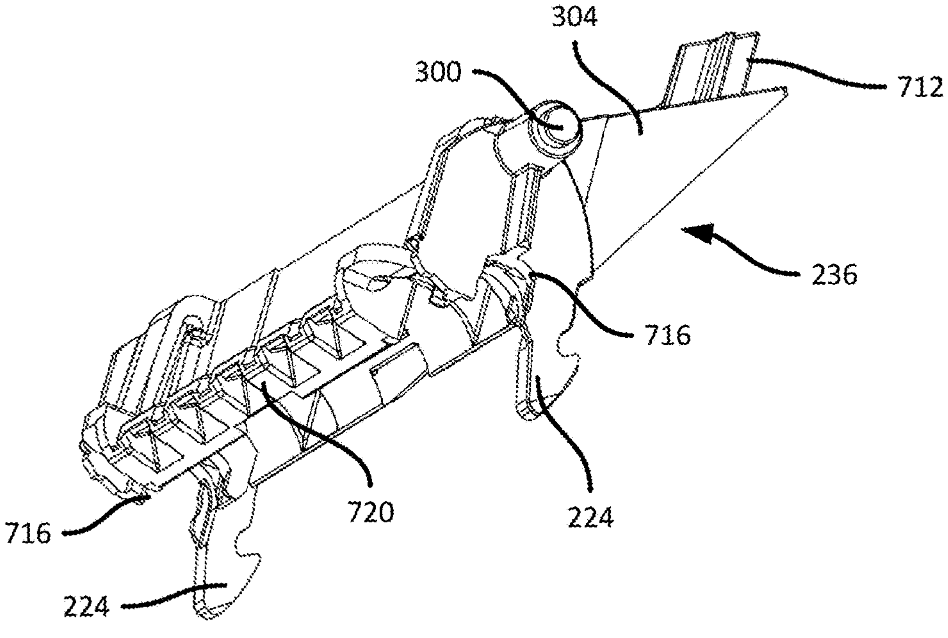

Referring to FIGS. 7A and 7B, the frame 232 and the carriage 236 are shown in isolation. As shown in FIG. 7A, the frame 232 includes a spindle housing 700 to rotatably support the spindle 300 of the carriage 236, as well as an opening 704 exposing the platen roller 212 when the carriage 236 is installed in the frame 232. In addition, the frame 232 includes a set of castellations 708 at a forward edge of the opening 704. As will be seen below, the castellations 708 interact with complementary structures of the carriage 236 to form a continuous media guide that enables movement of the carriage 236 within the frame 232.

Turning to FIG. 7B, the carriage 236 can include a mount 712 to which the button 116 may affixed. The platen roller 212 is rotatably mounted on the carriage 236 by a pair of opposing shaft housings 716 The carriage 236 also includes a set of castellations 720 at a forward edge thereof.

Figure 8A:
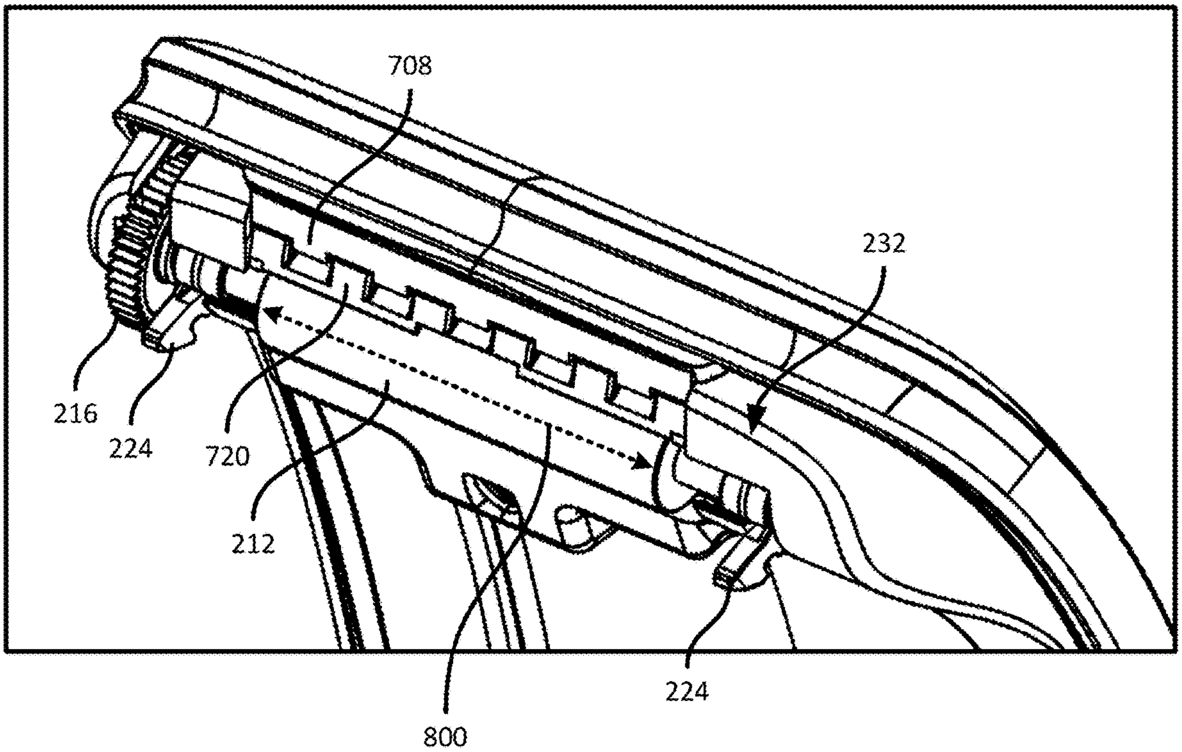
FIG. 8A is a detail view of a lid of the printer of FIG. 2.

Turning to FIG. 8A, a detailed view of the underside of the lid 112 is shown, with a portion of the carriage 236 and the platen roller 212 protruding through the opening 704. As seen in FIG. 8A, the castellations 708 of the frame 232 form a forward portion of a media guide surface, and the castellations 720 of the carriage 236 form a rearward portion of the media guide surface. The castellations 708 and 720 are interlaced, so as to form a continuous media guide surface where the carriage 236 and frame 232 meet. The resulting media guide surface is referred to as continuous because no interruption in the surface (e.g. the interruption between adjacent castellations 708 or adjacent castellations 720), as measured in a direction perpendicular to the direction of travel of the media (i.e. in a direction parallel to the length 800 of the platen roller 212) is equal to or greater than the width of the media itself.

Figure 8B:
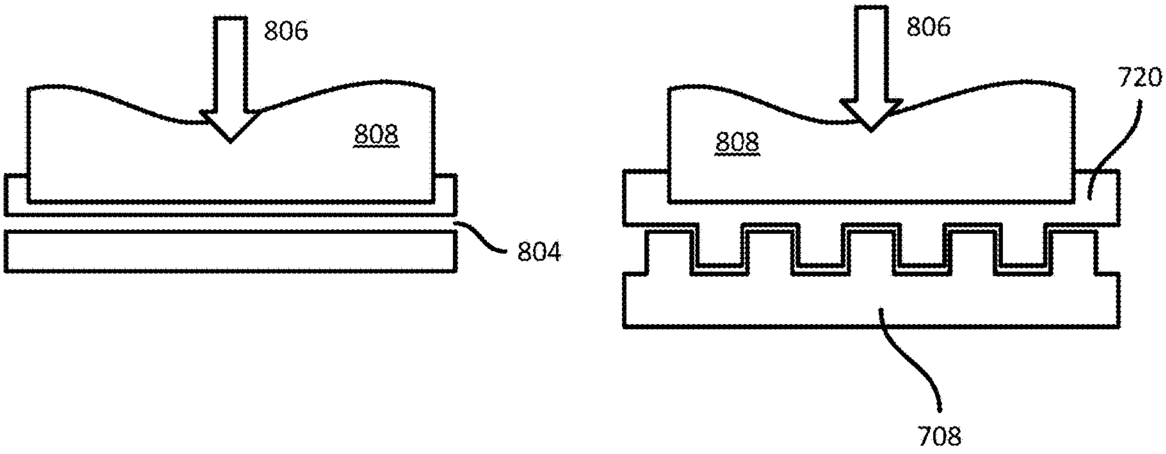
FIG. 8B is a diagram illustrating a media guide surface formed by the lid of FIG. 8A, in comparison to a media guide surface formed by a lid lacking the interlacing castellations of the lid of FIG. 8A.

The media is typically no wider than the length 800 of the platen roller. Therefore, the interlaced castellations provide a media guide surface with no interruptions greater in length than the length 800. In some examples, each castellation has a width of about one quarter of the length 800. In the illustrated example, no interruption in the media guide surface is greater than about one tenth of the length 800. As will now be apparent, an interruption of sufficient length in the media guide surface, such as the gap 804 shown in FIG. 8B (in the absence of the castellations 708 and 720), can allow a leading edge of the media 808, travelling in the direction 806, to catch in the gap 804. Providing smaller interruptions in the guide surface, as illustrated on the right-hand side of FIG. 8B, reduces or avoids such catching, while still allowing movement between the carriage 236 and the frame 232. As will also be apparent, the use of interlacing castellations to provide such a guide surface reduces or prevents catching of the media 808 in both travel directions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A printer, comprising:

a body including:

(i) a set of interior walls defining a media enclosure configured to receive a media cartridge, and (ii) a latch recess in one of the interior walls, the latch recess including a retaining surface, and a ramp surface;

a lid rotatably coupled to the body and movable between a closed position enclosing the media enclosure, and an open position, the lid includes an undercut portion at a forward edge thereof to form a ledge relative to an outer wall of the body when the lid is in the closed position;

a latch supported by the lid, movable relative to the lid between a locked position and an unlocked position;

a button disposed at an upper surface of the lid, the button configured to move the latch to the unlocked position when pressed; and a bias member configured to partially open the lid in response to the button being pressed.

2. The printer of claim 1, further comprising:

a platen roller; and a drive gear disposed in the body, the drive member being operatively coupled to the platen roller, the button decouples the platen roller from the drive gear in response to the button being pressed and allows the bias member to partially open the lid, in response to being partially opened, the lid is moveable to the open position in response to a lifting force applied to the undercut portion of the lid.

3. The printer of claim 1, wherein the latch is rotatable relative to lid; and wherein the ramp surface is inclined in a direction of rotation of the latch.

4. The printer of claim 1, wherein the lid includes a frame supporting a carriage rotatable relative to the frame; and wherein the latch extends from the carriage.

5. The printer of claim 4, wherein the bias member includes a coil spring.

6. The printer of claim 4, wherein the lid includes the platen roller supported by the carriage;

wherein the drive gear is operatively coupled to the platen roller when the lid is in the closed position and the latch is in the locked position; and wherein movement of the latch to the unlocked position discouples the platen roller from the drive gear.

7. The printer of claim 4, wherein the frame includes a first media guide surface; and the carriage includes a second media guide surface, configured to cooperate with the first media guide surface to provide a continuous guide for media exiting the media enclosure.

8. The printer of claim 7, wherein a rear portion of the first media guide surface, and forward portion of the second media guide surface, each include complementary interlacing castellations.

9. The printer of claim 8, wherein each castellation has a width smaller than a width of the media.

10. The printer of claim 7, wherein the latch is rotatable relative to lid; and wherein the ramp surface is inclined in a direction of rotation of the latch.

* * * * *